US008804597B2

(12) United States Patent
Won et al.

(10) Patent No.: US 8,804,597 B2
(45) Date of Patent: Aug. 12, 2014

(54) APPARATUS AND METHOD FOR ADDING AND DELETING RELAY LINK IN COMMUNICATION SYSTEM

(75) Inventors: Seung-Hwan Won, Suwon-si (KR); Young-Bum Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 426 days.

(21) Appl. No.: 12/803,373

(22) Filed: Jun. 25, 2010

(65) Prior Publication Data

US 2010/0329148 A1 Dec. 30, 2010

(30) Foreign Application Priority Data

Jun. 26, 2009 (KR) .......................... 10-2009-0057393

(51) Int. Cl.
*H04W 40/12* (2009.01)
(52) U.S. Cl.
USPC ........... 370/315; 370/492; 370/501; 455/13.1
(58) Field of Classification Search
None
See application file for complete search history.

(56) References Cited

U.S. PATENT DOCUMENTS

| | | | |
|---|---|---|---|
| 2004/0142716 A1* | 7/2004 | Orlik et al. ................ | 455/522 |
| 2006/0194548 A1* | 8/2006 | Nagaraj ..................... | 455/73 |
| 2006/0281404 A1* | 12/2006 | Lee et al. .................. | 455/11.1 |
| 2007/0081479 A1* | 4/2007 | Kang et al. ................ | 370/310 |
| 2007/0104127 A1* | 5/2007 | Suh et al. .................. | 370/328 |
| 2007/0183321 A1* | 8/2007 | Takeda et al. ............. | 370/229 |
| 2008/0107091 A1* | 5/2008 | Ramachandran .......... | 370/338 |
| 2008/0108369 A1* | 5/2008 | Visotsky et al. ........... | 455/455 |
| 2008/0227461 A1* | 9/2008 | Dayal et al. ............... | 455/452.2 |
| 2008/0232296 A1* | 9/2008 | Shin et al. ................. | 370/315 |
| 2009/0003267 A1* | 1/2009 | Ramachandran et al. .. | 370/328 |
| 2009/0181693 A1* | 7/2009 | So et al. .................... | 455/453 |
| 2009/0285088 A1* | 11/2009 | Feng et al. ................ | 370/216 |
| 2010/0110974 A1* | 5/2010 | Zhang et al. .............. | 370/315 |
| 2010/0227620 A1* | 9/2010 | Naden et al. .............. | 455/445 |
| 2011/0235618 A1* | 9/2011 | Senarath et al. .......... | 370/331 |

* cited by examiner

*Primary Examiner* — Hassan Phillips
*Assistant Examiner* — Duc Duong

(57) ABSTRACT

An apparatus and a method effectively adds and deletes a relay link in a communication system that includes a multiple relay system. The apparatus and method include determining by a relay mode controller whether to add or delete the relay link with consideration of at least one of a movement velocity of User Equipment (UE), a signal intensity of a Node-B and at least one relay station, and a channel state value of the UE. When addition or deletion of the relay link is determined, a message requesting addition of the relay link or a message informing deletion of the relay link is transmitted by a signaling processor to a relay station corresponding to the relay link whose addition or deletion has been determined.

24 Claims, 9 Drawing Sheets

APPARATUS AND METHOD FOR ADDING AND DELETING RELAY LINK IN COMMUNICATION SYSTEM

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Jun. 26, 2009 and assigned Serial No. 10-2009-0057393, the entire disclosure of which is hereby incorporated by reference.

TECHNICAL FIELD OF THE INVENTION

The present invention relates to an apparatus and a method for adding and deleting a relay link in a communication system. More particularly, the present invention relates to an apparatus and a method for effectively adding and deleting a relay link when a multiple relay station is used in a Decode-and-Forward (DF)-based communication system.

BACKGROUND OF THE INVENTION

Generally, a voice-oriented service in the conventional second Generation (2G) Code Division Multiple Access (CDMA) communication system is provided through relatively low speed traffic channels in both a forward direction and a reverse direction. Here, the forward direction denotes a direction from a Node-B to a user equipment (UE), and the reverse direction denotes a direction from a UE to a Node-B. However, users currently desire various services rather than just a simple voice-oriented service. To meet such users' demand, systems that can provide both the voice service and a data service are being developed. In addition, a global standard is being prepared. Recently, a communication system has evolved from a system that provides a voice-oriented service to a 3G system that aims to provide a high speed data service. Many research efforts on a system that realizes a data service-oriented multimedia service are in progress.

In the general communication system, signaling transmission/reception is performed through a direct link between a fixed node-B and User Equipment (UE). A current communication system has low flexibility in realization of a radio network because the position of a Node-B is fixed, and a shadowing region exists, and has difficulty in providing efficient communication service under a wireless environment where a channel state changes much. To overcome the above disadvantages, an alternative of applying a relay method to an existing communication system is being studied.

The relay method allows signaling transmission/reception to be performed through a relay link between a Node-B and UE by installing a relay station between the Node-B and the UE. The relay method can increase the capacity of a system and extend a cell service area. That is, when a channel state is poor between a Node-B and UE, it is possible to provide a radio channel whose channel state is better to the UE, provide a data channel of a higher speed, and extend a cell service area through the relay link.

The relay method is divided into an Amplify-and-Forward (AF) and a Decode-and-Forward (DF). In the AF, a relay station amplifies a reception signal and transfers the same. In the DF, a relay station decodes a reception signal, encodes the signal again, and transfers the same. When using the DF, a relay station may be realized to read a reception signal and transfer a reconfigured signal, and when needed, to directly perform scheduling to allocate a resource.

A multiple relay station may be used for the DF-based CDMA communication system. When the multiple relay station is used, there is a need for a signaling method for effectively adding and deleting a relay link in order to provide the relay link between a Node-B and UE.

SUMMARY OF THE INVENTION

To address the above-discussed deficiencies of the prior art, it is a primary aspect of the present invention is to address at least the above-mentioned problems and/or disadvantages and to provide at least the advantages described below. Accordingly, an aspect of the present invention is to provide an apparatus and a method for adding and deleting a relay link in a communication system.

Another aspect of the present invention is to provide an apparatus and a method for effectively adding and deleting a relay link when a multiple relay station is used in a DF-based communication system.

Yet another aspect of the present invention is to provide an apparatus and a method for determining, at the UE, addition or deletion of a relay link using a Doppler estimation value, the Energy per Chip over the Interference plus Noise (Ec/Io), and Channel Quality Indicator (CQI) information, and activating or inactivating a relay mode depending upon the acceptance of a corresponding relay station when a multiple relay station is used in a DF-based communication system.

Yet another aspect of the present invention is to provide an apparatus and a method for allowing a relay station requested by UE to add a relay link to determine whether addition of the relay link is possible depending upon the total transmit carrier power, and determine whether to allow the UE to activate a relay mode when a multiple relay station is used in a DF-based communication system.

In accordance with an aspect of the present invention, a method for adding or deleting, at User Equipment (UE), a relay link in a communication system is provided. The method includes determining whether to add or delete the relay link with consideration of at least one of a movement velocity of the UE, a signal intensity of a Node-B and at least one relay station, and a channel state value of the UE. When addition or deletion of the relay link is determined, a message requesting addition of the relay link or a message informing deletion of the relay link is transmitted to a relay station corresponding to the relay link whose addition or deletion has been determined.

In accordance with another aspect of the present invention, a method for controlling, at a relay station, addition of a relay link in a communication system is provided. The method includes, when a message requesting addition of the relay link is received from User Equipment (UE), determining whether to accept addition of the relay link using total transmit carrier power. A message including information as to whether the addition of the relay link is accepted is transmitted to the UE.

In accordance with yet another aspect of the present invention, an apparatus of User Equipment (UE) for adding or deleting a relay link in a communication system is provided. The apparatus includes a relay mode controller for determining whether to add or delete the relay link with consideration of at least one of a movement velocity of the UE, a signal intensity of a Node-B and at least one relay station, and a channel state value of the UE. The apparatus also includes a signaling processor for, when addition or deletion of the relay link is determined, generating a message requesting addition of the relay link or a message informing deletion of the relay link to be transmitted to a relay station corresponding to the relay link whose addition or deletion has been determined.

In accordance with yet another aspect of the present invention, an apparatus of a relay station, for controlling addition of a relay link in a communication system, is provided. The apparatus includes a relay mode determining unit for, when a message requesting addition of the relay link is received from User Equipment (UE), determining whether to accept addition of the relay link using total transmit carrier power. The apparatus also includes a signaling processor for generating a message to be transmitted to the UE, the message including information as to whether the addition of the relay link is accepted.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
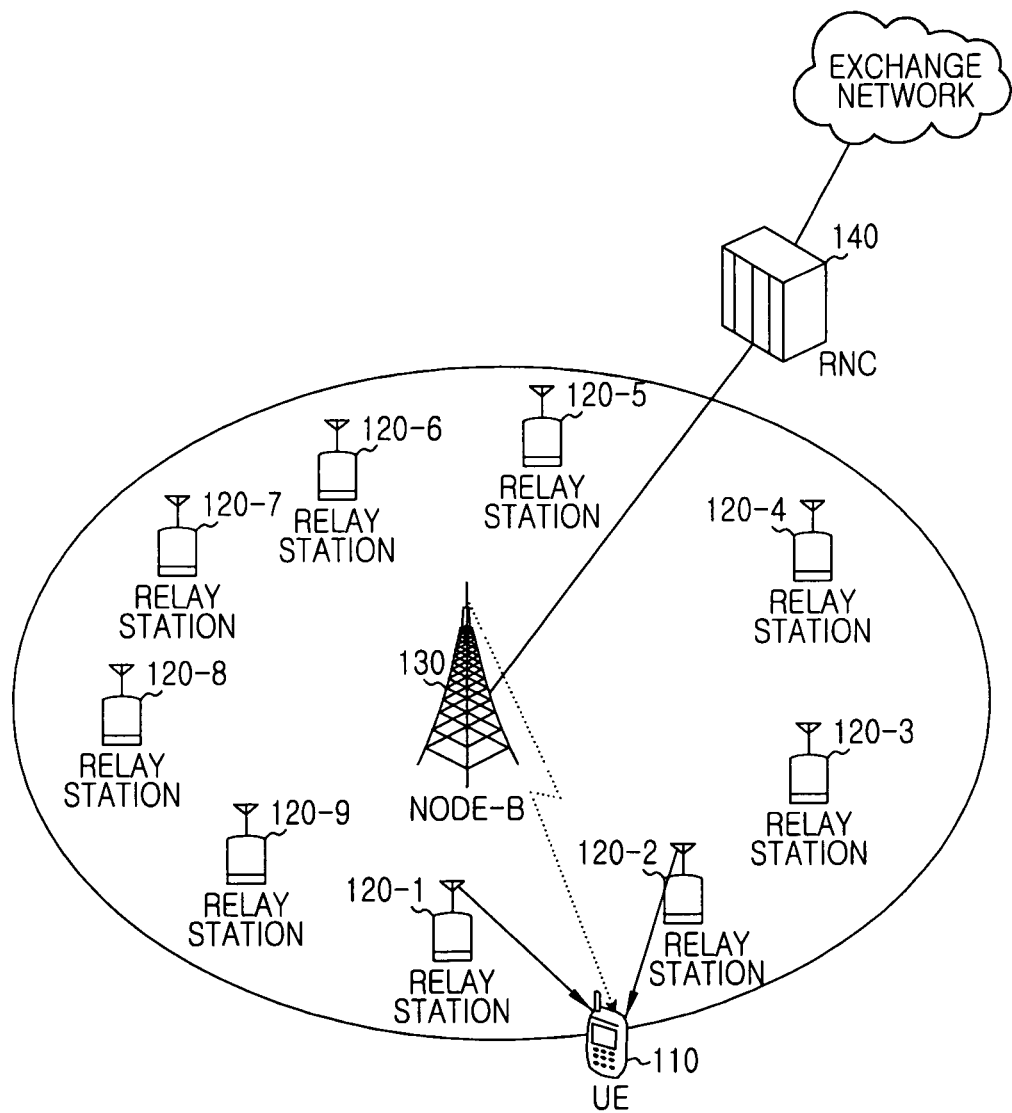
FIG. 1 illustrates a communication system according to an embodiment of the present invention.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The terms and words used in the following description and claims are not limited to the bibliographical meanings, but, are merely used by the inventor to enable a clear and consistent understanding of the invention. Accordingly, it should be apparent to those skilled in the art that the following description of embodiments of the present invention are provided for illustration purpose only and not for the purpose of limiting the invention as defined by the appended claims and their equivalents.

Embodiments of the present invention provide a signaling method for effectively adding and deleting a relay link when a multiple relay system is used in a DF-based communication system.

Though a CDMA system is described in the following description, an embodiment of the present invention is applicable to any communication system that employs effective addition and deletion of a relay link. In addition, in the following description, a relay station may be realized as a fixed relay station, a relay station that includes mobility, or a general terminal that uses a data transfer method of a relay type.

When a relay station transfers a signal received from a Node-B under a predetermined spreading factor to UE, a timing and a channel estimation value of a signal that the UE receives from the relay station are totally different from those of a signal received from the Node-B. Therefore, a pilot channel needs to be allocated to each relay station.

A Common Pilot Channel (referred to as a 'CPICH' hereinafter) is a forward physical channel and is used for notifying a reference of a timing to an entire cell. That is, the CPICH is used for transmitting a pilot signal to all UEs inside the cell. The CPICH is divided into a Primary (P)-CPICH, and a Secondary (S)-CPICH. According to an embodiment of the present invention, it is assumed that a double P-CPICH is allocated to a Node-B and an S-CPICH is allocated to a relay station. When a plurality of relay stations is used, different S-CPICHs may be allocated to the relay stations.

In the CDMA system, all channels are discriminated by a channelization code. UE receives information regarding a cell from a Node-B, and performs swift communication with the Node-B using the information. When performing communication via a relay link between UE and a Node-B, the UE needs to receive information regarding a relay station in order to perform swift communication with the relay station. Therefore, information regarding available relay stations located inside each cell has to be transmitted to the UE. For example, information regarding an S-CPICH allocated to a relay station has to be transmitted to the UE. The information regarding the S-CPICH includes information regarding a secondary scrambling code and a channelization code allocated to a relevant S-CPICH.

Here, a method for transmitting information regarding the S-CPICH to UE is described below. First, a method in which a Node-B may add information of an S-CPICH allocated to a relay station, located in the cell corresponding to the Node-B, to a system information region of an Radio Resource Control (RRC) message, and transmit the same to UE is possible. The UE that has received the message may transmit corresponding information to the Node-B using the RRC message. Next, a method where a Node-B may transmit information of an S-CPICH allocated to a relay station located in the cell corresponding to the Node-B to UE using a signal of a physical layer, for example, using a High Speed Shared Control Channel HS-SCCH part2 unused region. The UE that has received the signal may transmit corresponding information to the Node-B using a signal of a physical layer, that is, a message region of a Random Access Channel (RACH).

FIG. 1 illustrates a communication system according to an embodiment of the present invention.

Referring to FIG. 1, the communication system includes a Radio Network Controller (RNC) 140, a node-B 130, relay stations 120-1~120-9, and User Equipment (UE) 110.

The UE 110 is user equipment, is movable, and performs communication with the Node-B 130 via a radio channel. At this point, the Node-B 130 and the UE 110 may directly transmit/receive a signal, and may transmit/receive a signal via a relay link provided by the relay stations 120-1 and 120-2. According to an embodiment of the present invention, the UE 110 determines addition and deletion of a relay link using a Doppler estimation value, Ec/Io, and CQI information, and activates or inactivates a relay mode depending upon the acceptance of the relay stations 120-1 and 120-2. Here, to determine addition and deletion of the relay link, a round trip delay value measured by the Node-B 130, a Received Signal Code Power (RSCP) measured by the UE 110 using a signal received via a P-CPICH, a path loss measured by the UE 110, and such, may be additionally used, or a portion of a Doppler estimation value, Ec/Io, and CQI information may be used instead.

The relay stations 120-1 and 120-2 read a signal between the Node-B 130 and the UE 110, and transfer a reconfigured signal. According to an embodiment of the present invention, the relay stations 120-1 and 120-2 determine whether addition of a relay link is possible depending upon the total transmit carrier power, and determine whether to accept relay mode activation of the UE 110.

The Node-B 130 is responsible for a wireless access of the UE 110. The RNC 140 controls the Node-B 130, is responsible for allocation and management of a radio resource, and is responsible for service connection via a Core Network (CN).

Figure 2:
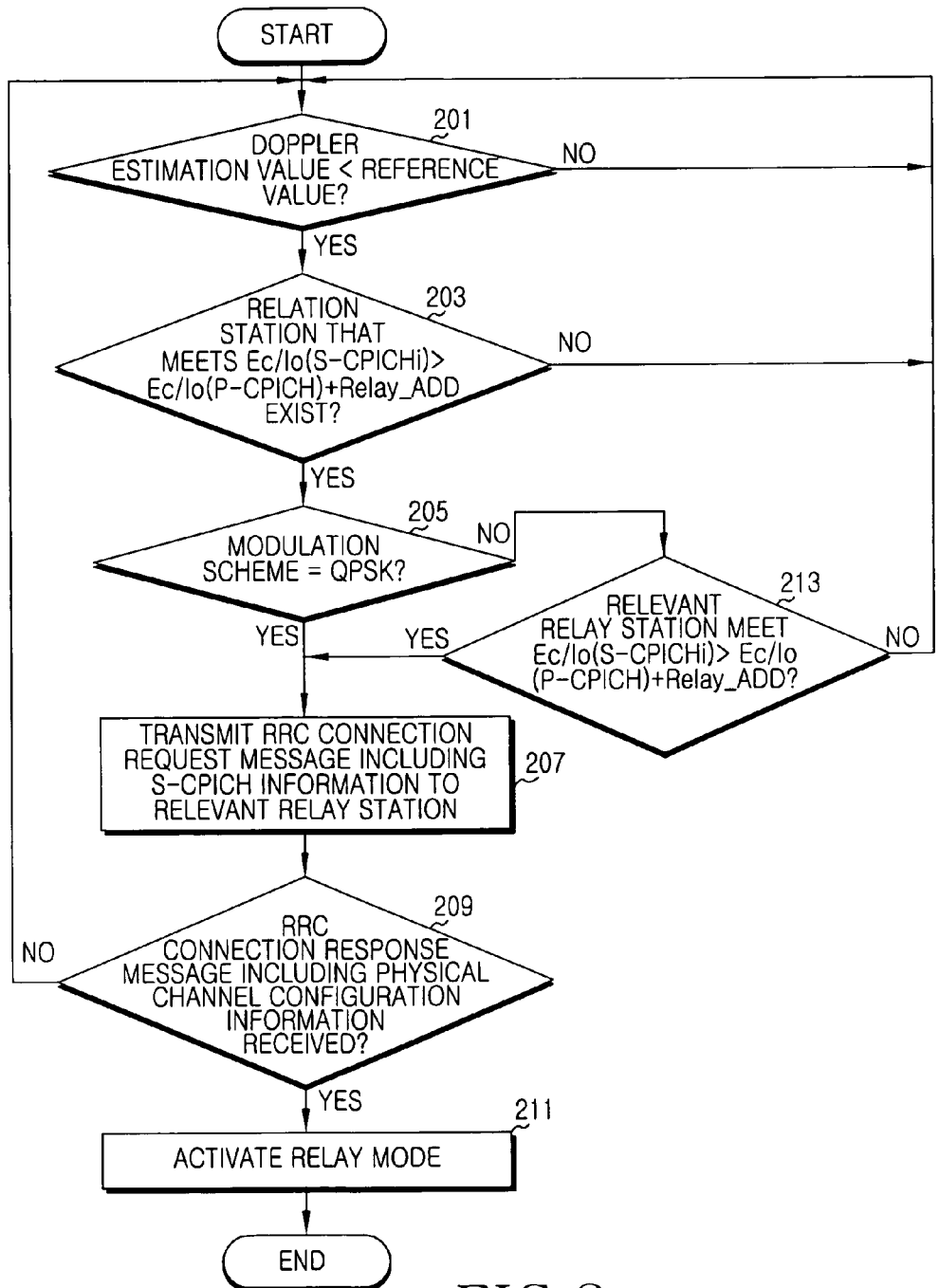
FIG. 2 illustrates a process in a UE for effectively adding a relay link when a multiple relay station is used in a communication system according to an embodiment of the present invention.

FIG. 2 is a flowchart illustrating an operating method of UE, for effectively adding a relay link when a multiple relay station is used in a communication system according to an embodiment of the present invention.

Referring to FIG. 2, the UE determines whether a Doppler estimation value is smaller than a reference value in block 201. This is for determining whether a movement velocity of the UE is lower than the reference value. The Doppler estimation value may be replaced by different information that can determine the movement velocity of the UE. In addition, the movement velocity of the UE may be determined using one or more information that can determine the movement velocity of the UE. Here, when the Doppler estimation value is less than the reference value, the UE determines that the velocity of itself is lower than the reference value. When the Doppler estimation value is equal to or greater than the reference value, the UE determine that the movement velocity of itself is equal to or greater than the reference value.

When the Doppler estimation value is equal to or greater than the reference value in block 201, the UE returns to block 201.

In contrast, when the Doppler estimation value is less than the reference value in block 201, the UE compares Ec/Io of each relay station measured in a period T1 with a value obtained by adding a predetermined margin value to Ec/Io of a Node-B measured in the period T1 to determine whether a relay station that has an Ec/Io value greater than the value obtained by adding the predetermined margin value to Ec/Io of the Node-B exists in block 203. That is, the UE determines whether a relay station that meets Equation (1) exists. This is for comparing a signal intensity of a Node-B with that of a relay station. Ec/Io may be replaced by alternate measurements that represent a signal intensity.

$$Ec/Io(S\text{-}CPICHi) > Ec/Io(P\text{-}CPICH) + Relay\_ADD \quad [\text{Eqn. I}]$$

where Ec/Io(S-CPICHi) is Ec/Io of an i-th S-CPICH of S-CPICHs detected from a reception signal, Ec/Io(P-CPICH) is Ec/Io of a P-CPICH detected from a reception signal, and Relay_ADD is a margin value and may be set to a predetermined value between 3 dB and 6 dB.

When a relay station that includes Ec/Io greater than a value obtained by adding a predetermined margin value to Ec/Io of a Node-B does not exist in block 203, the UE returns to block 201.

In contrast, when the relay station that includes Ec/Io greater than the value obtained by adding the predetermined margin value to Ec/Io of the Node-B exists in block 203, the UE determines CQI information to be fed back to the Node-B, and determines whether a modulation scheme mapped to the determined CQI information is a modulation scheme of an order less than a reference value, for example, Quadrature Phase Shift Keying (QPSK) in block 205. This is for determining whether a channel state of the UE is good, that is, for determining whether the channel state value of the UE is equal to or greater than the reference value. When the modulation scheme mapped to the determined CQI information is a modulation scheme of an order less than the reference value, for example, QPSK, the UE determines that a channel state is not good. When the modulation scheme mapped to the determined CQI information is a modulation scheme of an order greater than the reference value, for example, Quadrature Amplitude Modulation (QAM), the UE may determine that the channel state is good. In addition, to determine whether the channel state of the UE is good, the UE may determine a degree in which the UE is separated from the Node-B using a round trip delay value measured by the Node-B. Here, the round trip delay value denotes a time taken until the Node-B receives an RACH transmitted from the UE that receives a P-CPICH after the Node-B transmits the P-CPICH to the UE.

When a movement velocity of the UE is low, a relay station that includes Ec/Io equal to or greater by a predetermined margin value than the Node-B exists in the neighborhood of the UE, and the channel state of the UE is poor, that is, a channel state value of the UE is less than the reference value, the UE may determine that communicating with the Node-B via a relay link provided by the relay station existing in the neighborhood of itself is preferable to communicating with the Node-B via a direct link. Therefore, when the modulation scheme mapped to the determined CQI information is the modulation scheme of the order less than the reference value (for example, QPSK) in block 205, the UE determines to add a relay link provided by a relay station that meets Equation (1), and transmits a Radio Resource Control (RRC) connection request message for requesting addition of the relay link to the Node-B and the relay station corresponding to the relay link to be added in block 207. Here, the RRC connection request message includes an identifier of the UE and information regarding an S-CPICH corresponding to the relay station of the relay link to be added.

The UE determines whether an RRC connection response message for accepting addition of the relay link is received from the Node-B in block 209. Here, the RRC connection response message for accepting the addition of the relay link includes physical channel configuration information.

When the RRC connection response message for accepting addition of the relay link is received in block 209, the UE adds the relay link by configuring a physical channel using the physical channel configuration information, thereby activating a relay mode in block 211. Though not shown, the UE may transmit an RRC ACK message informing reception success of the RRC connection response message to the relay station of the relay link to be added and the Node-B.

In contrast, when an RRC connection response message for rejecting addition of the relay link is received in block 209, the UE returns to block 201.

When the movement velocity of the UE is low, a relay station that includes Ec/Io that is greater by a predetermined margin value than that of the Node-B exists in the neighborhood of the UE, but a channel state of the UE is good, that is a channel state value of the UE is equal to or greater than the reference value, the UE performs a procedure of determining again whether the relay station existing in the neighborhood and meeting Equation (1) has Ec/Io greater by the predetermined margin value than that of the Node-B. When obtaining the same result even after the repeated determination, the UE may determine to add a relay link provided by the relay station. Therefore, when the modulation scheme mapped to the determined CQI information is the modulation scheme of the order higher than the reference value (for example, QAM), the UE compares Ec/Io of the relay station existing in the neighborhood measured in a period T2 with a value obtained by adding a predetermined margin value to Ec/Io of the Node-B measured in the period T2 to determine whether Ec/Io of the relay station existing in the neighborhood is greater than the value obtained by adding the predetermined margin value to the Ec/Io of the Node-B in block 213. That is, the UE determines again whether the relay station existing in the neighborhood meets Equation (1).

When determining again that the relay station existing in the neighborhood has Ec/Io greater than the value obtained by adding the predetermined margin value to the Ec/Io of the Node-B, the UE proceeds to block 207.

In contrast, when it is not determined again that the relay station existing in the neighborhood has Ec/Io greater than the value obtained by adding the predetermined margin value to the Ec/Io of the Node-B, the UE returns to block 201.

After that, the UE ends the algorithm according to an embodiment of the present invention.

Figure 3:
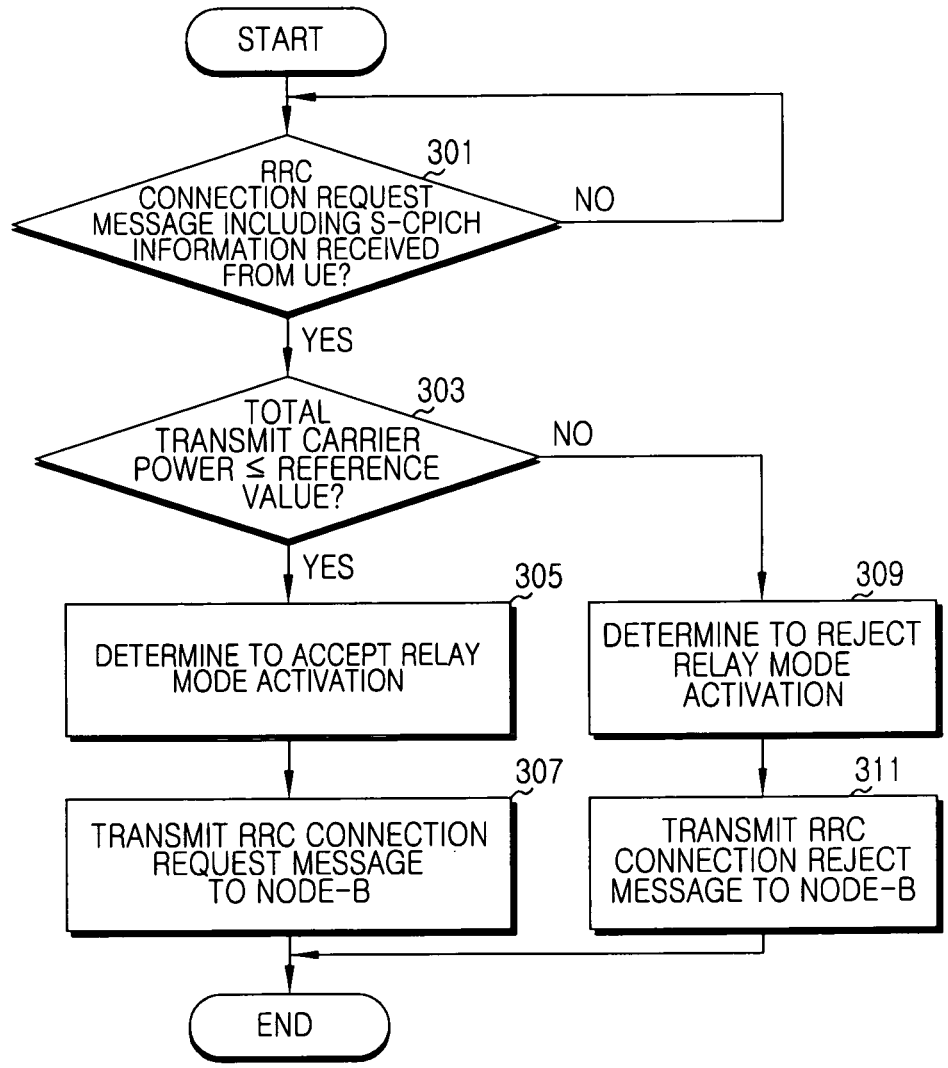
FIG. 3 illustrates a process in a relay station for effectively adding a relay link when a multiple relay station is used in a communication system according to an embodiment of the present invention.

FIG. 3 illustrates a process in a relay system for effectively adding a relay link when a multiple relay station is used in a communication system according to an embodiment of the present invention.

Referring to FIG. 3, the relay station determines whether an RRC connection request message for requesting addition of a relay link is received from UE in block 301. Here, the RRC connection request message includes an identifier of the UE and information regarding an S-CPICH corresponding to the relay station.

When receiving an RRC connection request message for requesting addition of a relay link in block 301, the relay station determines whether total transmit carrier power is equal to or less than a reference value in order to determine whether addition of the relay link is possible in block 303. That is, the relay station determines whether Equation (2) is met. Equation (2) determines whether relay link addition of the UE is possible depending upon a DownLink (DL) cell load of the relay station. The total transmit carrier power may be replaced by different information that can determine the DL cell load of the relay station. In addition, to determine whether relay link addition of the UE, information that can determine the DL cell load of the Node-B may be additionally used.

$$Ptot(R) \leq Pth \qquad [\text{Eqn. 2}]$$

where $Ptot(R)$ is total transmit carrier power of the relay station, and $Pth$ is a power reference value.

When the total transmit carrier power is equal to or less than the reference value in block 303, the relay station determines that addition of a relay link of the UE is possible and determines to accept relay mode activation in block 305, and transmits an RRC connection request message informing acceptance of addition of the relay link to the Node-B in block 307. At this point, the Node-B obtains physical channel configuration information in cooperation with a Radio Network Controller (RNC), and may accept addition of the relay link by transmitting an RRC connection response message including the obtained physical channel configuration information to the relay station and the UE.

In contrast, when the total transmit carrier power is greater than the reference value in block 303, the relay station determines that addition of the relay link of the UE is impossible and determines to reject relay mode activation in block 309, and transmits an RRC connection reject message informing rejection of addition of the relay link to the Node-B in block 311. At this point, the Node-B may transmit an RRC connection response message rejecting addition of the relay link to the relay station and the UE.

After that, the relay station ends the algorithm according to an embodiment of the present invention.

Figure 4:
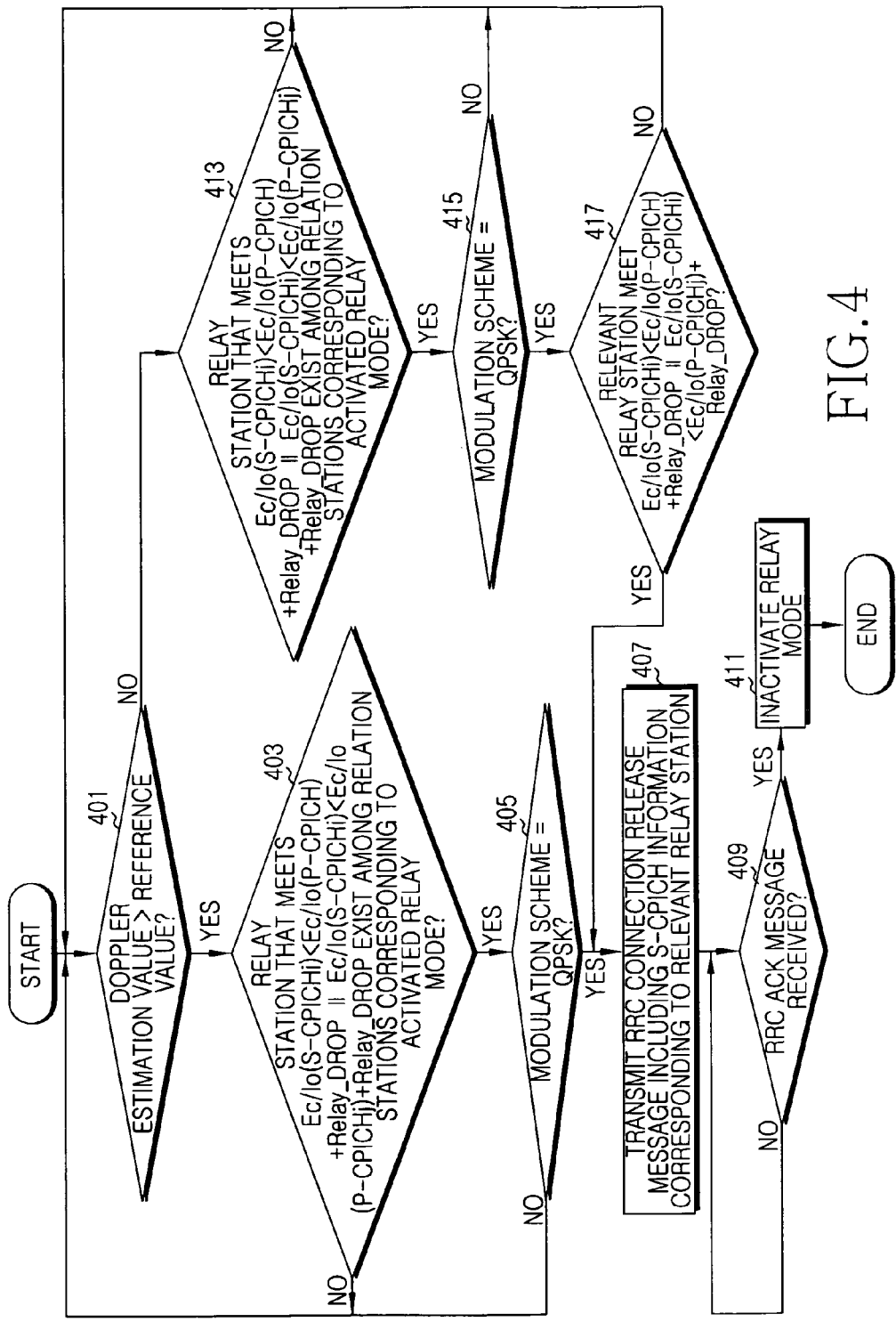
FIG. 4 illustrates a process in a UE for effectively deleting a relay link when a multiple relay station is used in a communication system according to an embodiment of the present invention.

FIG. 4 illustrates a process in a UE for effectively deleting a relay link when a multiple relay station is used in a communication system according to an embodiment of the present invention.

Referring to FIG. 4, the UE determines whether a Doppler estimation value is greater than a reference value in block 401. Block 401 determines whether the movement velocity of the UE is greater than the reference value. The Doppler estimation value may be replaced by different information that can determine the movement velocity of the UE. In addition, the UE may determine the movement velocity of itself using one or more information that can determine the movement velocity of the UE. Here, when the Doppler estimation value is greater than the reference value, the UE determines the movement velocity of itself is greater than the reference value. When the Doppler estimation value is equal to or less than the reference value, the UE may determine that the movement velocity of itself is equal to or less than the reference value.

When the Doppler estimation value is greater than the reference value in block 401, the UE compares Ec/Io of a relay station measured in a period T1 among relay stations corresponding to a currently activated relay mode with a value obtained by adding a predetermined margin value to Ec/Io of a Node-B measured in the period T1, and compares Ec/Io of the relay station with a value obtained by adding a predetermined margin value to Ec/Io of a different relay station (corresponding to a currently inactivated relay mode) measured in the period T1 to determine whether an activated relay station that includes Ec/Io smaller than the value obtained by adding the predetermined margin value to Ec/Io of the Node-B exists, or whether an activated relay station that includes Ec/Io smaller than a value obtained by adding the predetermined margin value to Ec/Io of the different relay station exists in block 403. That is, the UE determines whether a relay station that meets Equation (3) exists. Equation (3) is used to compare a signal intensity of an activated relay station with a signal intensity of a Node-B and for comparing a signal intensity of an activated relay station with a signal intensity of different relay stations. Ec/Io may be replaced by different information representing a signal intensity.

$$(Ec/Io(S-CPICHi) < Ec/Io(P-CPICH) + Relay\_DROP) \\ \| \\ (Ec/Io(S-CPICHi) < Ec/Io(S-CPICHj) + Relay\_DROP)$$ [Eqn. 3]

where Ec/Io(S–CPICHi) is Ec/10 of an i-th S-CPICH among S-CPICHs corresponding to a currently activated relay mode, Ec/Io(P–CPICH) is Ec/Io of a P-CPICH detected from a reception signal, Ec/Io(S–CPICHj) is Ec/Io of a j-th S-CPICH among the rest of S-CPICHs that excludes an S-CPICH corresponding to a currently activated relay mode in S-CPICHs detected from a reception signal, and Relay_DROP is a margin value and may be set to a predetermined value between 3 dB and 6 dB.

When a relay station that includes Ec/Io smaller than a value obtained by adding a predetermined margin value to Ec/Io of a Node-B does not exist among relay stations corresponding to a currently activated relay mode, and a relay station that includes Ec/Io smaller than a value obtained by adding a predetermined margin value to Ec/Io of a different relay station does not exist in block 403, the UE returns to block 401.

In contrast, when a relay station that includes Ec/Io smaller than a value obtained by adding a predetermined margin value to Ec/Io of a Node-B exists among relay stations corresponding to a currently activated relay mode, or a relay station that includes Ec/Io smaller than a value obtained by adding a predetermined margin value to Ec/Io of a different relay station exists in block 403, the UE determines CQI information to be fed back to the Node-B, and determines whether a modulation scheme mapped to the determined CQI information is a modulation scheme of an order less than a reference value, for example, QPSK in block 405. This is for determining whether a channel state of the UE is good. When the modulation scheme mapped to the determined CQI information is a modulation scheme of an order less than the reference value (for example, QPSK), the UE determines the channel state is poor. When the modulation scheme mapped to the determined CQI information is a modulation scheme of an order higher than the reference value (for example, QAM), the UE may determine that the channel state is good.

When the movement velocity of the UE is high, and a relay station that includes Ec/Io smaller than a value obtained by adding a predetermined margin value to Ec/Io of a Node-B exists among relay stations corresponding to a currently activated relay mode, or when a relay station that includes Ec/Io smaller than a value obtained by adding a predetermined margin value to Ec/Io of a different relay station exists and the channel state of the UE is poor, the UE may determine that communicating with the Node-B via a direct link, or communicating with the Node-B via a relay link provided by a different relay station is preferable to communicating with the Node-B via a relay link provided by the existing relay station. Therefore, when the modulation scheme mapped to the determined CQI information is the modulation scheme of the order less than the reference value (for example, QPSK) in block 405, the UE determines to delete a relay link provided by a relay station that meets Equation (3), and transmits an RRC connection release message informing the deletion of the relay link to the Node-B and the relay station corresponding to the relay link to be deleted in block 407. Here, the RRC connection release message includes an identifier of the UE and information of an S-CPICH corresponding to the relay station of the relay link to be deleted. At this point, the relay station transmits an RRC connection release message to the Node-B, and the Node-B may transmit an RRC ACK message to the relay station and the UE in cooperation with the RNC.

The UE determines whether an RRC ACK message informing reception success of an RRC connection release message is received from the Node-B in block 409.

When receiving the RRC ACK message in block 409, the UE deletes the relay link, thereby inactivating the corresponding relay mode in block 411.

In contrast, when the modulation scheme mapped to the determined CQI information is the modulation scheme of the order higher than the reference value (for example, QAM) in block 405, the UE returns to block 401.

When the movement velocity of the UE is low but a relay station that includes Ec/Io smaller than a value obtained by adding a predetermined margin value to Ec/Io of the Node-B exists among relay stations corresponding to a currently activated relay mode, or when a relay station that includes Ec/Io smaller than a value obtained by adding a predetermined margin value to Ec/Io of a different relay station exists and the channel state of the UE is poor, the UE performs a procedure of determining again whether the existing relay station has Ec/Io smaller than the value obtained by adding the predetermined margin value to Ec/Io of the Node-B, or has Ec/Io smaller than the value obtained by adding the predetermined margin value to Ec/Io of a different relay station. When obtaining the same result even after the repeated determination, the UE may determine to delete the relay link provided by the relay station.

Therefore, when the Doppler estimation value is equal to or smaller than the reference value in block 401, the UE compares Ec/Io of a relay station measured in a period T1 among relay stations corresponding to a currently activated relay mode with a value obtained by adding a predetermined margin value to Ec/Io of a Node-B measured in the period T1, and compares Ec/Io of the relay station with a value obtained by adding a predetermined margin value to Ec/Io of a different relay station measured in the period T1 to determine whether a relay station that includes Ec/Io smaller than the value obtained by adding the predetermined margin value to Ec/Io of the Node-B exists, or whether a relay station that includes Ec/Io smaller than a value obtained by adding the predetermined margin value to Ec/Io of the different relay station exists in block 413. That is, the UE determines whether a relay station that meets Equation (3) exists.

When the relay station that includes Ec/Io smaller than the value obtained by adding the predetermined margin value to Ec/Io of the Node-B does not exist among the relay stations corresponding to the currently activated relay mode, and the relay station that includes Ec/Io smaller than the value obtained by adding the predetermined margin value to Ec/Io of the different relay station does not exist in block 413, the UE returns to block 401.

In contrast, when the relay station that includes Ec/Io smaller than the value obtained by adding the predetermined margin value to Ec/Io of the Node-B exists among the relay stations corresponding to the currently activated relay mode, or the relay station that includes Ec/Io smaller than the value obtained by adding the predetermined margin value to Ec/Io of the different relay station exists in block 413, the UE determines the CQI information to be fed back to the Node-B, and determines whether the modulation scheme mapped to the determined CQI information is the modulation scheme of the order less than the reference value, for example, QPSK in block 415. This is for determining whether the channel state of the UE is good. When the modulation scheme mapped to the determined CQI information is the modulation scheme of the order less than the reference value (for example, QPSK), the UE determines that the channel state is poor. When the modulation scheme mapped to the determined CQI information is the modulation scheme of the order higher than the reference value (for example, QAM), the UE determines that the channel state is good.

When the modulation scheme mapped to the determined CQI information is the modulation scheme of the order higher than the reference value (for example, QAM) in block 415, the UE returns to block 401.

In contrast, when the modulation scheme mapped to the determined CQI information is the modulation scheme of the order lower than the reference value (for example, QPSK) in block 415, the UE compares Ec/Io of the existing relay station measured in a period T2 with a value obtained by adding a predetermined value to Ec/Io of the Node-B measured in the period T2, and compares Ec/Io of the existing relay station with a value obtained by adding a predetermined margin value to Ec/Io of a different relay station measured in the period T2 to determine whether Ec/Io of the existing relay station is smaller than the value obtained by adding the predetermined value to Ec/Io of the Node-B, or whether Ec/Io of the existing relay station is smaller than the value obtained by adding the predetermined margin value to Ec/Io of a different relay station in block 417. That is, the UE determines whether the existing relay station meets Equation (3) again.

When it is determined again that the existing relay station has Ec/Io that is smaller than the value obtained by adding the predetermined margin value to Ec/Io of the Node-B, or has Ec/Io that is smaller than the value obtained by adding the predetermined margin value to Ec/Io of the different relay station, the UE proceeds to block 407.

In contrast, when it is not determined again that the existing relay station has Ec/Io that is smaller than the value obtained by adding the predetermined margin value to Ec/Io of the Node-B, or has Ec/Io that is smaller than the value obtained by adding the predetermined margin value to Ec/Io of the different relay station, the UE returns to block 401.

After that, the UE ends the algorithm according to an embodiment of the present invention.

Figure 5:
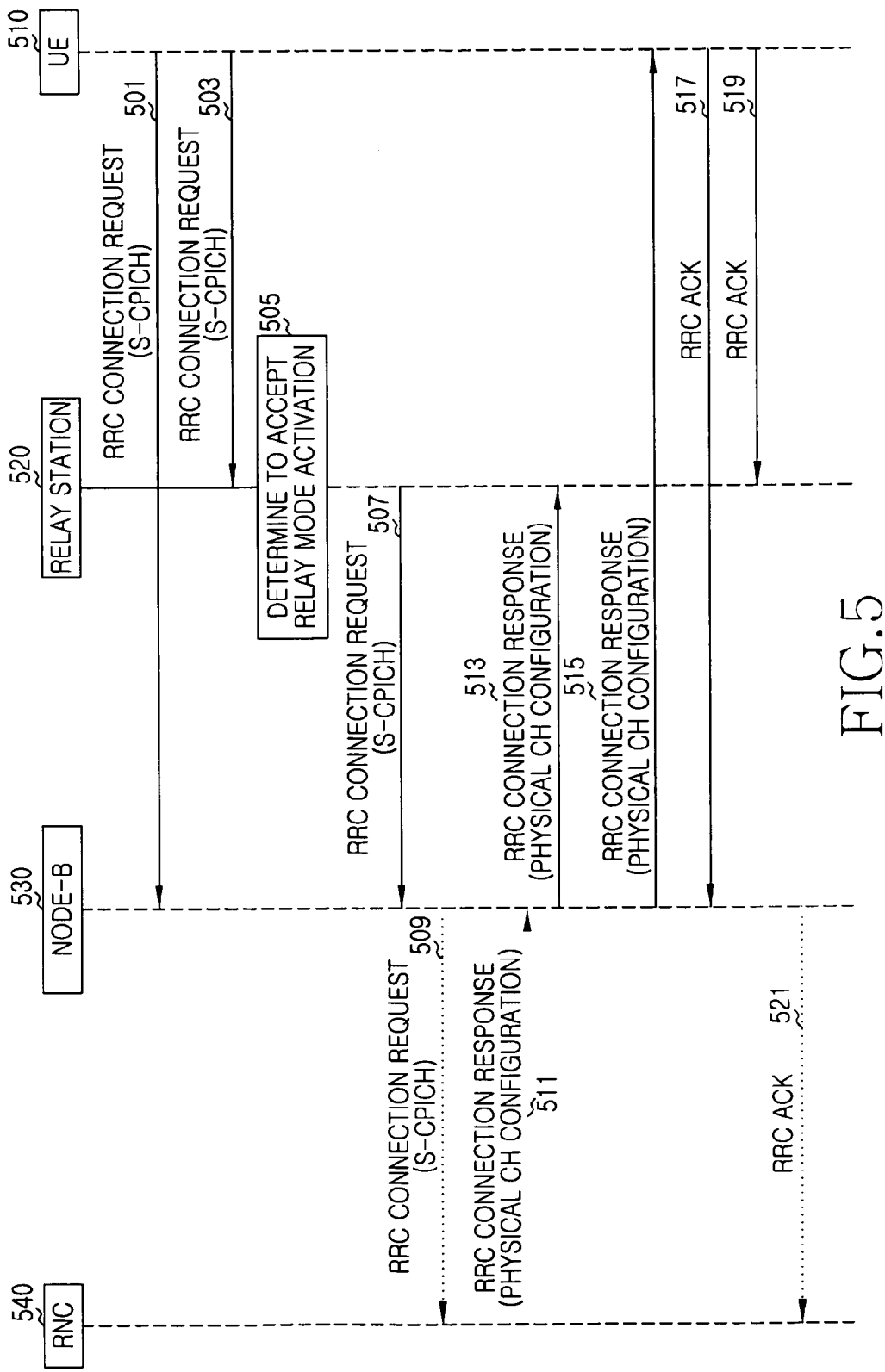
FIG. 5 illustrates an entire signal flow where UE requests addition of a relay link, and a relay station accepts the addition when a multiple relay station is used in a communication system according to an embodiment of the present invention.

FIG. 5 illustrates an entire signal flow in which a UE requests addition of a relay link, and a relay station accepts the addition in a communication system that uses a multiple relay station according to an embodiment of the present invention.

Referring to FIG. 5, the UE 510 determines whether to add a relay link provided by a relay station 520 using a Doppler estimation value, Ec/Io, and CQI information. When determining to add the relay link, the UE 510 transmits an RRC connection request message 501 and 503 for requesting addition of the relay link to a Node-B 530 and the relay station 520. Here, the RRC connection request message 501 and 503 includes an identifier of the UE 510, and information regarding an S-CPICH corresponding to the relay station 520.

At this point, the relay station 520 may determine whether to accept relay mode activation of the UE 510 by determining whether addition of the relay link is possible depending upon the total transmit carrier power. When determining to accept the relay mode activation of the UE 510 in block 505, the relay station 520 transmits an RRC connection request message 507 informing acceptance of the relay link addition to a Node-B 530. At this point, the Node-B 530 may transmit an RRC connection request message 509 to the RNC 540 and receive an RRC connection response message 511 for accepting the addition of the relay link from the RNC 540. Here, the RRC connection response message 511 includes physical channel configuration information.

The Node-B transmits the RRC connection response message 513 and 515 to the relay station 520 and the UE 510. At this point, the UE 510 adds the relay link by configuring a physical channel using the physical channel configuration information, thereby activating a relay mode. In addition, the UE 510 may transmit an RRC ACK message 517 and 519 for informing reception success of the RRC connection response message to the Node-B 530 and the relay station 520, and the Node-B 530 may transmit the RRC ACK message 521 to the RNC 540.

Figure 6:
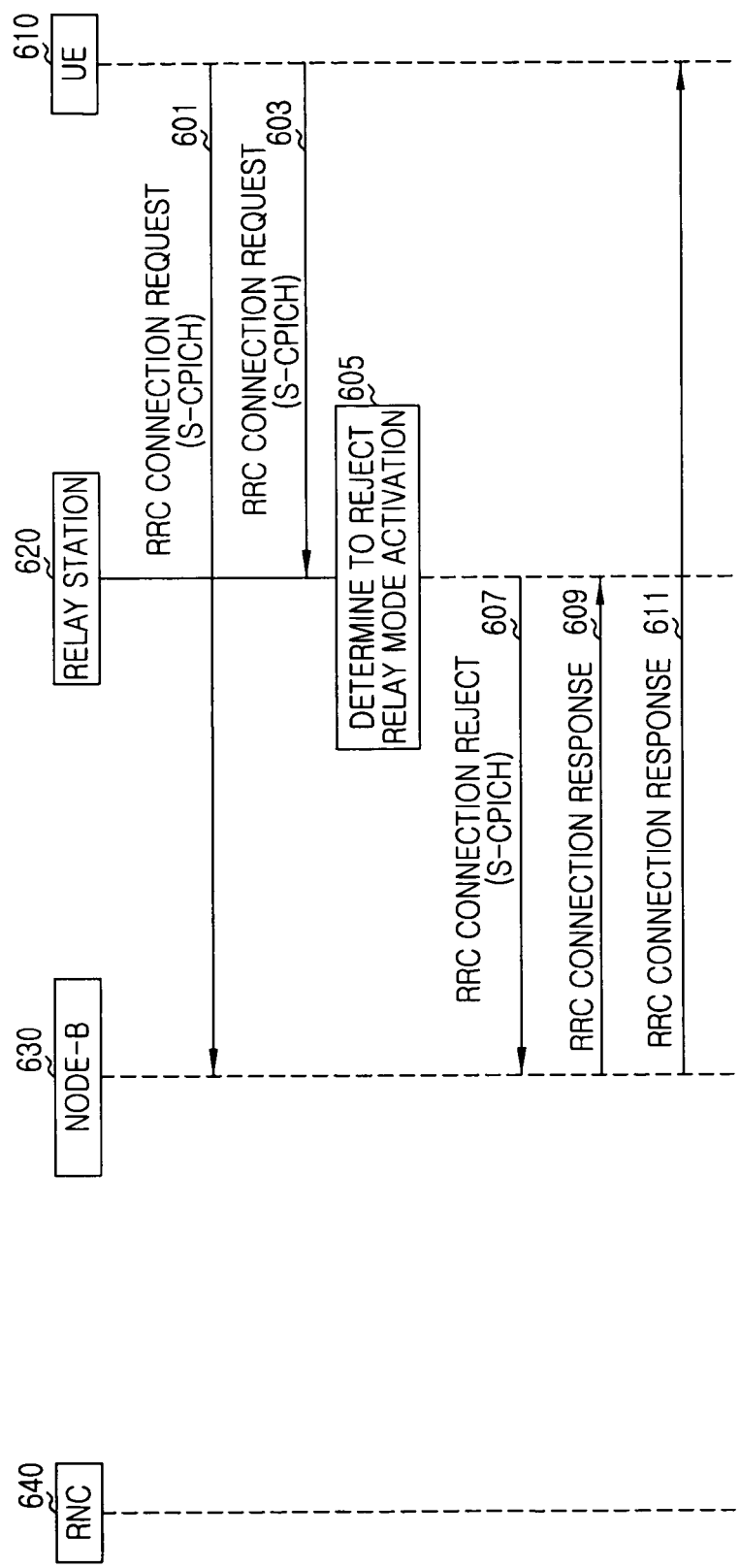
FIG. 6 illustrates an entire signal flow where UE requests addition of a relay link, and a relay station rejects the addition when a multiple relay station is used in a communication system according to an embodiment of the present invention.

FIG. 6 illustrates an entire signal flow in which the UE requests addition of a relay link, and a relay station rejects the addition in a communication system that uses a multiple relay station according to an embodiment of the present invention.

Referring to FIG. 6, the UE 610 determines whether to add a relay link provided by a relay station 620 using a Doppler estimation value, Ec/Io, and CQI information. When determining to add the relay link, the UE 610 transmits RRC connection request message 601 and 603 for requesting addition of the relay link to a Node-B 630 and the relay station 620. Here, the RRC connection request message includes an identifier of the UE 610 and information regarding an S-CPICH corresponding to the relay station 620.

At this point, the relay station 620 may determine whether to accept relay mode activation of the UE 610 by determining whether addition of the relay link is possible depending upon the total transmit carrier power. When determining to reject the relay mode activation of the UE 610 in block 605, the relay station 620 transmits an RRC connection reject message 607, informing rejection of the relay link addition, to the Node-B 630. At this point, the Node-B 630 may transmit RRC connection response message 609 and 611 for rejecting the addition of the relay link to the relay station 620 and the UE 610.

Figure 7:
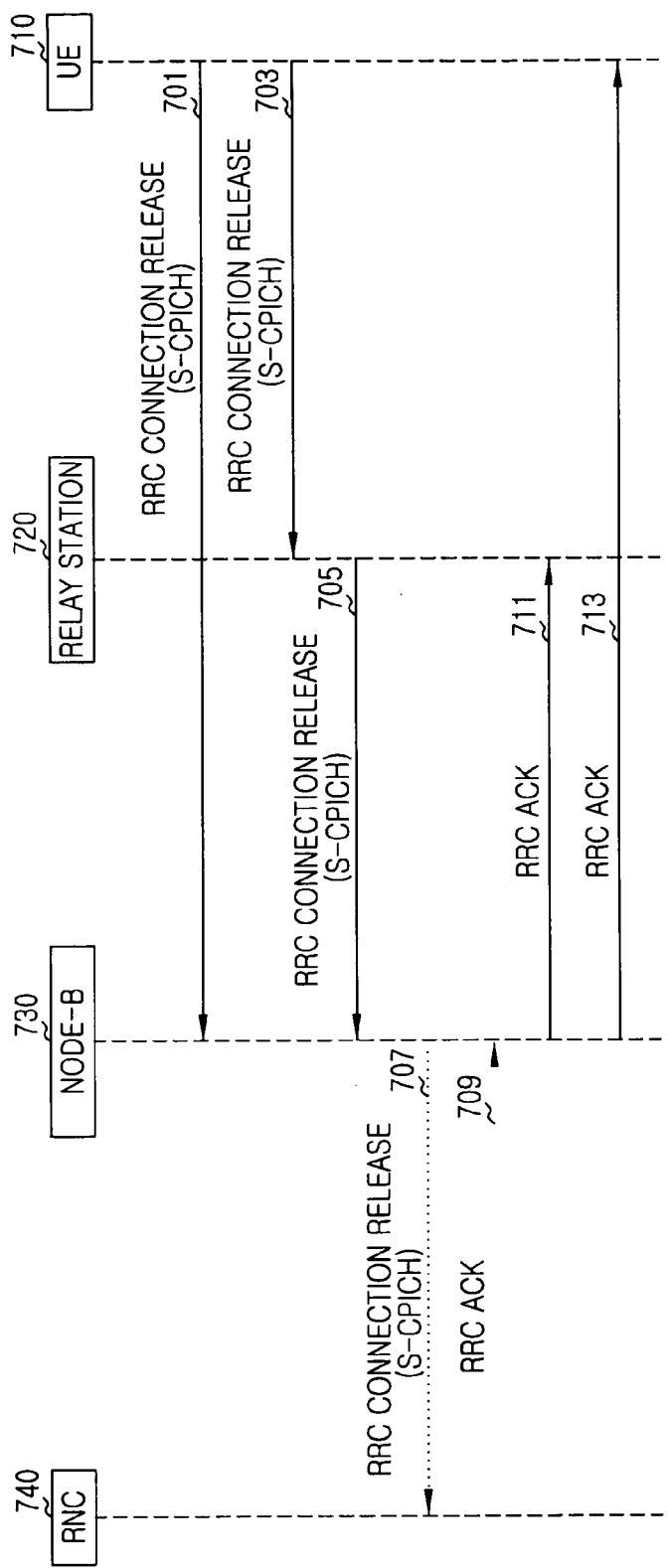
FIG. 7 illustrates an entire signal flow where UE deletes a relay link when a multiple relay station is used in a communication system according to an embodiment of the present invention.

FIG. 7 illustrates an entire signal flow in which a UE deletes a relay link in a communication system that uses a multiple relay station according to an embodiment of the present invention.

Referring to FIG. 7, the UE 710 determines whether to delete a relay link provided by a relay station 720 corresponding to a currently activated relay mode using a Doppler estimation value, Ec/Io, and CQI information. When determining to delete the relay link, the UE 710 transmits RRC connection release message 701 and 703 informing deletion of the relay link to a Node-B 730 and the relay station 720. Here, the RRC connection release message includes an identifier of the UE 710 and information regarding an S-CPICH corresponding to the relay station 720. At this point, the relay station 720 transmits an RRC connection release message 705 to the Node-B 730.

The Node-B 730 may transmit an RRC connection release message 707 to an RNC 740, and receive an RRC ACK message 709 informing a reception success of the RRC connection release message from the RNC 740. At this point, the Node-B 730 transmits the RRC ACK message 711 and 713 to the relay station 720 and the UE 710. Accordingly, the UE 710 deletes the relay link, thereby inactivating the corresponding relay mode.

Figure 8:
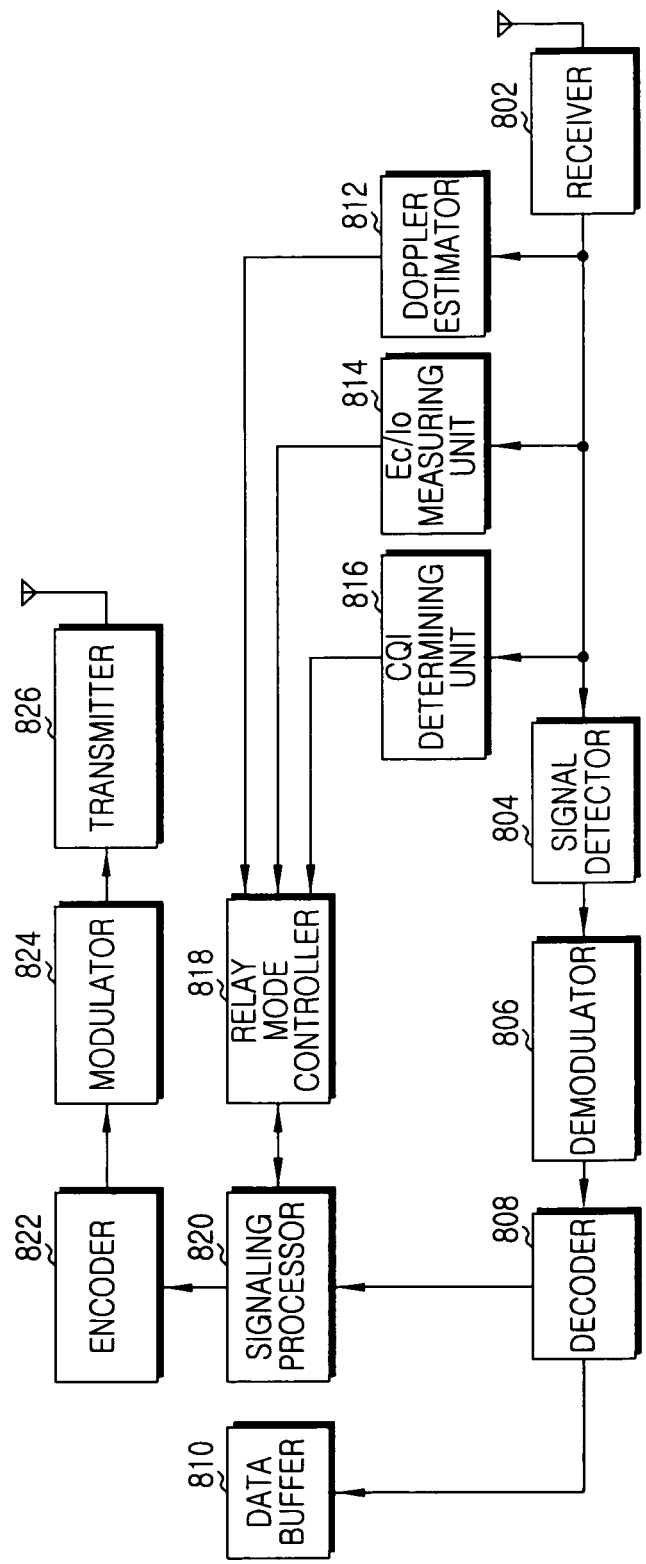
FIG. 8 illustrates a UE in a communication system according to an embodiment of the present invention.

FIG. 8 illustrates a UE in a communication system according to an embodiment of the present invention.

Referring to FIG. 8, the UE includes a receiver 802, a signal detector 804, a demodulator 806, a decoder 808, a data buffer 810, a Doppler estimator 812, an Ec/Io measuring unit 814, a CQI determining unit 816, a relay mode controller 818, a signaling processor 820, an encoder 822, a modulator 824, and a transmitter 826.

Referring to FIG. 8, the receiver 802 converts a Radio Frequency (RF) signal received via a reception antenna into a baseband signal. According to an embodiment of the present invention, the receiver 802 may include a multipath searching unit for searching for a signal received via a P-CPICH allocated to a Node-B and an S-CPICH allocated to each available relay station located inside a cell from reception signals. Here, rake fingers for signals received via the S-CPICH allocated to each relay station may be designed such that they are shared temporally with a rake finger for signals received via the P-CPICH allocated to a Node-B.

The signal detector 804 detects a transmission signal using a reception signal provided from the receiver 802 and channel information obtained using the reception signal.

The demodulator 806 demodulates baseband signals provided by the signal detector 804 and converts them into an encoded bit string.

The decoder 808 decodes an encoded bit string provided by the demodulator 806 to obtain an information bit string, provides a data bit string of the information bit string to the data buffer 810, and provides a control message bit string to the signaling processor 820.

The data buffer 810 temporarily stores received data.

The Doppler estimator 812 estimates a Doppler frequency using a P-CPICH signal provided by the receiver 802 to output a Doppler estimation value. According to an embodiment of the present invention, the Doppler estimation value is used as information for determining the movement velocity of the UE.

The Ec/Io measuring unit 814 measures corresponding Ec/Io using signals received via a P-CPICH and an S-CPICH among signals provided by the receiver 802. According to an embodiment of the present invention, Ec/Io is used as information for determining whether a relay station that includes a stronger intensity than that of the Node-B exists in the neighborhood of the UE.

The CQI determining unit 816 estimates a channel using a signal provided by the receiver 802, and determines a CQI value according to channel information. The determined CQI value may be fed back to the Node-B as CQI information. According to an embodiment of the present invention, the CQI information is used as information for determining a channel state, and is determined with consideration of an ability of the UE. For example, when the UE supports reception antenna diversity, high CQI information is fed back to the Node-B.

The relay mode controller 818 determines addition or deletion of a relay link provided by a relay station using a Doppler estimation value provided by the Doppler estimator 812, Ec/Io provided by the Ec/Io measuring unit 814, and CQI information provided by the CQI determining unit 816, and activates or inactivates a relay mode depending upon the acceptance of a relevant relay station.

The signaling processor 820 determines information included in a control message by reading the control message received from a relay station or a Node-B, and generates a control message to be transmitted to the relay station or the Node-B. More particularly, according to an embodiment of the present invention, when the relay mode controller 818 determines to add a relay link provided by a relay station, the signaling processor 820 generates an RRC connection request message for requesting addition of the relay link, and when receiving an RRC connection response message for accepting the addition of the relay link, the signaling processor 820 provides physical channel configuration information inside the RRC connection response message to the relay mode controller 818. At this point, the relay mode controller 818 adds the relay link by configuring a physical channel using the physical channel configuration information, thereby activating a relay mode. Here, the RRC connection request message includes an identifier of the UE, and information regarding an S-CPICH corresponding to the relay station. In addition, when the relay mode controller 818 determines to delete a relay link provided by the relay station, the signaling processor 820 generates an RRC connection release message informing deletion of the relay link, and when receiving an RRC ACK message informing reception success of the RRC connection release message, the signaling processor 820 informs the relay mode controller 818 of the reception of the RRC ACK message. At this point, the relay mode controller 818 deletes the relay link, thereby inactivating the corresponding relay mode. Here, the RRC connection release message includes an identifier of the UE and information regarding an S-CPICH corresponding to the relay station.

The encoder 822 encodes an information bit string provided by the signaling processor 820.

The modulator 824 modulates an encoded bit string provided by the encoder 822 to convert the encoded bit string into modulation symbols.

The transmitter 826 converts a baseband signal provided by the modulator 824 into an RF signal, and transmits the same via a transmission antenna.

Figure 9:
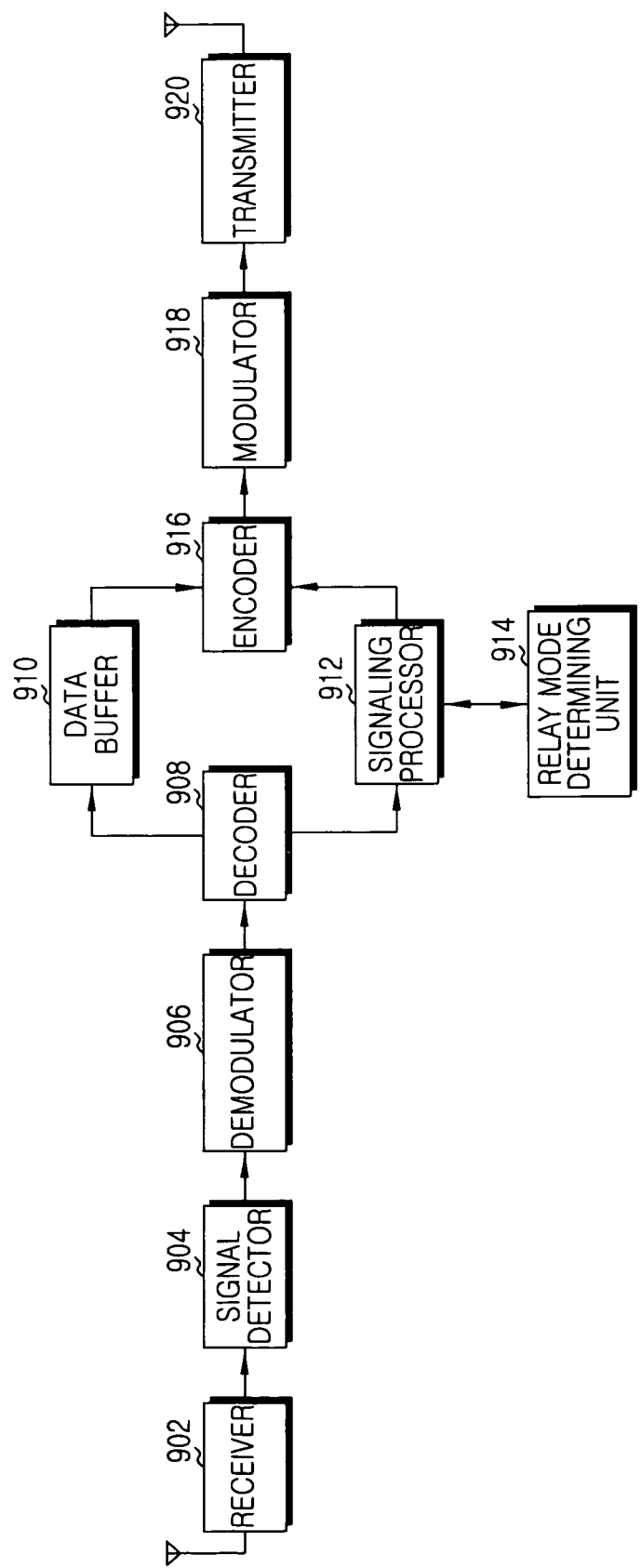
FIG. 9 illustrates a relay station in a communication system according to an embodiment of the present invention.

FIG. 9 illustrates a relay station in a communication system according to an embodiment of the present invention.

Referring to FIG. 9, the relay station includes a receiver 902, a signal detector 904, a demodulator 906, a decoder 908, a data buffer 910, a signaling processor 912, a relay mode determining unit 914, an encoder 916, a modulator 918, and a transmitter 920.

Referring to FIG. 9, the receiver 902 converts an RF signal received via a reception antenna into a baseband signal.

The signal detector 904 detects a transmission signal using a reception signal provided by the receiver 902 and channel information obtained using the reception signal.

The demodulator 906 demodulates baseband signals provided by the signal detector 904 to convert them into an encoded bit string.

The decoder 908 decodes an encoded bit string provided by the demodulator 906 to convert the encoded bit string into an information bit string, provides a data bit string of the information bit string to the data buffer 910, and provides a control message bit string to the signaling processor 912.

The data buffer 910 temporarily stores data to be transmitted and received data, and outputs stored data to the encoder 916 when transmitting the data.

The signaling processor 912 determines information included in a control message by reading the control message received from UE or a Node-B, and generates a control message to be transmitted to the UE or the Node-B. More particularly, according to an embodiment of the present invention, when receiving an RRC connection request message for requesting addition of a relay link from the UE, the signal processor 912 informs the relay mode determining unit 914 of the reception of the RRC connection request message. At this point, the relay mode determining unit 914 determines whether to accept relay mode activation of the UE, and the signaling processor 912 generates an RRC connection request message informing the Node-B of acceptance of the addition of the relay link, or an RRC connection reject message informing the Node-B of rejection of the addition of the relay link. In addition, when receiving an RRC connection release message informing deletion of a relay link from the UE, the signaling processor 912 informs the relay mode determining unit 914 of the reception of the RRC connection release message, and generates an RRC connection release message to be transmitted to the Node-B.

The relay mode determining unit 914 determines whether addition of a relay link is possible depending upon the total transmit carrier power to determine whether to accept relay mode activation of the UE.

The encoder 916 encodes an information bit string provided by the data buffer 910 and the signaling processor 912.

The modulator 918 modulates an encoded bit string provided by the encoder 916 to convert the encoded bit string into modulation symbols.

The transmitter 920 converts a baseband signal provided by the modulator 918 into an RF signal, and transmits the RF signal via a transmission antenna.

Though a method using an RRC message, which is an upper layer signal, that is, a method using a system information region of an RRC message has been proposed as a message transmission method for adding and deleting a relay link, a method using a physical layer signal may be used as a different method. For example, it is possible to request relay link addition or deletion, or inform addition, rejection, or deletion of a relay link using a message region of a Random Access Channel (RACH), instead of an RRC connection request message, an RRC connection release message, or an RRC connection reject message transmitted by UE to a relay station and a Node-B, and by a relay station to a Node-B. Here, the RACH denotes a reverse control channel that transmits initial control information.

In addition, it is possible to inform relay link addition or rejection, or transmit a response to a relay link release using a part2 unused region of a High Speed Shared Control Channel (HS-SCCH), instead of an RRC connection response message or an RRC ACK message transmitted by a Node-B to a relay station and UE. Here, the HS-SCCH denotes a forward control channel that transmits control information.

As described above, an embodiment of the present invention allows effectively adding and deleting a relay link by determining, at UE, addition or deletion of a relay link using a Doppler estimation value, the Energy per Chip over the Interference plus Noise (Ec/Io), Channel Quality Indicator (CQI) information, and activating or inactivating a relay mode depending upon the acceptance of a corresponding relay station when a multiple relay station is used in a DF-based communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for adding and deleting, at a User Equipment (UE), a relay link in a communication system, the method comprising:
   determining whether to add the relay link based on a movement velocity of the UE, a signal intensity of a Node-B and at least one relay station, and a channel state value of the UE;
   transmitting a message requesting addition of the relay link to a relay station corresponding to the relay link, the relay station configured to relay signals between the UE and the Node-B over the relay link;
   determining whether to delete the relay link based on at least one of a movement velocity of the UE, a signal intensity of a Node-B and at least one relay station, and a channel state value of the UE; and
   transmitting a message informing deletion of the relay link to a relay station corresponding to the relay link.

2. The method of claim 1, further comprising:
   determining the movement velocity of the UE using a Doppler estimation value;
   determining the signal intensity of the Node-B and the at least one relay station using an Energy per Chip over the Interference plus Noise (Ec/Io) of signals received from the Node-B and the at least one relay station; and
   determining the channel state value of the UE using a modulation scheme mapped to Channel Quality Indicator (CQI) information.

3. The method of claim 2, wherein the signal received from the Node-B comprises a signal received via a Primary-Common Pilot Channel (P-CPICH) allocated to the Node-B, and the signal received from the at least one relay station comprises a signal received via a Secondary-Common Pilot Channel (S-CPICH) allocated to a relevant relay station of the at least one relay station.

4. The method of claim 1, wherein determining whether to add the relay link comprises, when the movement velocity of the UE is lower than a reference value, a relay station that includes a signal intensity greater than that of the Node-B exists among the at least one relay station, and the channel state value of the UE is smaller than a reference value, determining to add a relay link that corresponds to the relay station that exists.

5. The method of claim 1, wherein determining whether to add the relay link comprises:
   when the movement velocity of the UE is lower than a reference value, a relay station that includes a signal intensity greater than a signal intensity of the Node-B exists in a first period among the at least one relay station and the channel state value of the UE is not less than a reference value, determining whether the signal intensity of the relay station that exists is greater than the signal intensity of the Node-B in a second period; and
   when the signal intensity of the relay station that exists is greater than the signal intensity of the Node-B in the second period, determining to add a relay link that corresponds to the relay station that exists.

6. The method of claim 1, wherein determining whether to delete the relay link comprises, when the movement velocity of the UE is higher than a reference value, a relay station that includes one of a signal intensity smaller than a signal intensity of the Node-B and a signal intensity smaller than a signal intensity of a relay station whose relay mode is not currently activated exists among relay stations corresponding to a currently activated relay mode, and the channel state value of the UE is smaller than a reference value, determining to delete a relay link that corresponds to the relay station that exists.

7. The method of claim 1, wherein determining whether to delete the relay link comprises:
when the movement velocity of the UE is not greater than a reference value, a relay station that includes one of a signal intensity smaller than a signal intensity of the Node-B and a signal intensity smaller than a signal intensity of a relay station whose relay mode is not currently activated exists, in a first period, among relay stations corresponding to a currently activated relay mode, and the channel state value of the UE is smaller than a reference value, determining whether the signal intensity of the relay station that exists is one of smaller than the signal intensity of the Node-B and smaller than the signal intensity of a relay station whose relay mode is not currently activated in a second period; and
when the signal intensity of the relay station that exists is smaller than one of the signal intensity of the Node-B and the signal intensity of the relay station whose relay mode is not currently activated in the second period, determining to delete a relay link corresponding to the relay station that exists.

8. The method of claim 1, wherein each of the message requesting addition of the relay link and the message informing deletion of the relay link comprises information regarding an S-CPICH allocated to the relay station corresponding to the relay link, and is transmitted using one of a system information region of a Radio Resource Control (RRC) message and a message region of a Random Access Channel (RACH).

9. The method of claim 1, further comprising, when a message accepting the addition of the relay link is received from the Node-B, adding the relay link using physical channel configuration information included in the message accepting the addition of the relay link,
wherein the message accepting the addition of the relay link is received using one of a system information region of an RRC message and a part2 unused region of a High Speed Shared Control Channel (HS-SCCH).

10. The method of claim 1, further comprising, when a message informing a reception success of the message informing the deletion of the relay link is received from the Node-B, deleting the relay link,
wherein the message informing the reception success of the message informing the deletion of the relay link is received using one of a system information region of an RRC message and a part2 unused region of a High Speed Shared Control Channel (HS-SCCH).

11. A method for controlling, at a relay station, addition of a relay link in a communication system, the method comprising:
when a request message requesting addition of the relay link is received from a User Equipment (UE), determining whether to accept addition of the relay link based on a total transmit carrier power; and
transmitting a response message comprising information as to whether the addition of the relay link is accepted to the UE,
wherein the request message comprises information regarding a Secondary-Common Pilot Channel (S-CPICH) allocated to the relay station, and wherein the request message is transmitted using one of a system information region of a Radio Resource Control (RRC) message and a message region of a Random Access Channel (RACH).

12. The method of claim 11, wherein determining whether to accept the addition of the relay link comprises:
determining whether the total transmit carrier power is not greater than a reference value;
when the total transmit carrier power is not greater than the reference value, determining to accept the addition of the relay link; and
when the total transmit carrier power is greater than the reference value, determining to reject the addition of the relay link.

13. An apparatus of User Equipment (UE) for adding and deleting a relay link in communication system, the apparatus comprising:
a relay mode controller configured to determine whether to add the relay link based on a movement velocity of the UE, a signal intensity of a Node-B and at least one relay station, and a channel state value of the UE, and determine whether to delete the relay link based on at least one of a movement velocity of the UE, a signal intensity of a Node-B and at least one relay station, and a channel state value of the UE; and
a signaling processor configured to generate a message requesting addition of the relay link when addition of the relay link is determined and generate a message informing deletion of the relay link when deletion of the relay link is determined,
wherein the message requesting addition of the relay link or the message informing deletion of the relay link are transmitted to a relay station corresponding to the relay link, the relay station configured to relay signals between the UE and the Node-B over the relay link.

14. The apparatus of claim 13, further comprising:
a Doppler estimator configured to determine the movement velocity of the UE using a Doppler estimation value;
an Ec/Io measuring unit configured to determine a signal intensity of the Node-B and the at least one relay station using an Energy per Chip over the Interference plus Noise (Ec/Io) of signals received from the Node-B and the at least one relay station; and
a Channel Quality Indicator (CQI) determining unit configured to determine a channel state value of the UE using a modulation scheme mapped to CQI information.

15. The apparatus of claim 14, wherein the signal received from the Node-B comprises a signal received via a Primary-Common Pilot Channel (P-CPICH) allocated to the Node-B, and the signal received from the at least one relay station comprises a signal received via a Secondary-Common Pilot Channel (S-CPICH) allocated to a relevant relay station.

16. The apparatus of claim 13, wherein when the movement velocity of the UE is lower than a reference value, a relay station that includes a signal intensity greater than a signal intensity of the Node-B exists among the at least one relay station, and the channel state value of the UE is smaller than a reference value, the relay mode controller is further configured to determine to add a relay link corresponding to the relay station that exists.

17. The apparatus of claim 13, wherein when the movement velocity of the UE is lower than a reference value, a relay station that includes a signal intensity greater than a signal intensity of the Node-B exists among the at least one relay station in a first period, but the channel state value of the UE is not less than a reference value, the relay mode controller is further configured to determine whether a signal intensity of the relay station that exists is greater than the signal intensity of the Node-B in a second period, and
when the signal intensity of the relay station that exists is greater than the signal intensity of the Node-B in the second period, the relay mode controller is further configured to determine to add a relay link corresponding to the relay station that exists.

18. The apparatus of claim 13, wherein when the movement velocity of the UE is higher than a reference value, a relay station that includes one of a signal intensity smaller than a signal intensity of the Node-B and a signal intensity smaller than a signal intensity of a relay station whose relay mode is not currently activated exists among relay stations corresponding to a currently activated relay mode, and the channel state value of the UE is smaller than a reference value, the relay mode controller is further configured to determine to delete a relay link corresponding to the relay station that exists.

19. The apparatus of claim 13, wherein when the movement velocity of the UE is not greater than a reference value, a relay station that includes one of a signal intensity smaller than a signal intensity of the Node-B and a signal intensity smaller than a signal intensity of a relay station whose relay mode is not currently activated exists, in a first period, among relay stations corresponding to a currently activated relay mode, and the channel state value of the UE is smaller than a reference value, the relay mode controller is further configured to determine whether a signal intensity of the relay station that exists is one of smaller than the signal intensity of the Node-B and smaller than the signal intensity of the relay station whose relay mode is not currently activated in a second period, and when the signal intensity of the relay station that exists is one of smaller than the signal intensity of the Node-B and smaller than the signal intensity of the relay station whose relay mode is not currently activated in the second period, the relay mode controller is further configured to determine to delete a relay link corresponding to the relay station that exists.

20. The apparatus of claim 13, wherein each of the message requesting addition of the relay link and the message informing deletion of the relay link comprises information regarding an S-CPICH allocated to the relay station corresponding to the relay link, and is transmitted using one of a system information region of a Radio Resource Control (RRC) message and a message region of a Random Access Channel (RACH).

21. The apparatus of claim 13, wherein when a message accepting the addition of the relay link is received from the Node-B, the relay mode controller is further configured to add the relay link using physical channel configuration information included in the message accepting the addition of the relay link, wherein the message accepting the addition of the relay link is received using one of a system information region of an RRC message and a part2 unused region of a High Speed Shared Control Channel (HS-SCCH).

22. The apparatus of claim 13, wherein when a message informing a reception success of a message informing the deletion of the relay link is received from the Node-B, the relay mode controller is further configured to delete the relay link, wherein the message informing the reception success of the message informing the deletion of the relay link is received using one of a system information region of an RRC message and a part2 unused region of a High Speed Shared Control Channel (HS-SCCH).

23. An apparatus of a relay station, for controlling addition of a relay link in a communication system, the apparatus comprising:

a relay mode determining unit configured to, when a request message requesting addition of the relay link is received from a User Equipment (UE), determine whether to accept addition of the relay link based on a total transmit carrier power; and a signaling processor configured to generate a message to be transmitted to the UE, the message comprising information as to whether the addition of the relay link is accepted, wherein the request message comprises information regarding a Secondary-Common Pilot Channel (S-CPICH) allocated to the relay station and wherein the request message is transmitted using one of a system information region of a Radio Resource Control (RRC) message and a message region of a Random Access Channel (RACH).

24. The apparatus of claim 23, wherein the relay mode determining unit is further configured to:

determine whether the total transmit carrier power is not greater than a reference value, determine to accept the addition of the relay link when the total transmit carrier power is not greater than the reference value, and determine to reject the addition of the relay link when the total transmit carrier power is greater than the reference value.

\* \* \* \* \*